United States Patent
Huang

(10) Patent No.: US 7,583,392 B2
(45) Date of Patent: Sep. 1, 2009

(54) SURFACE PROFILE MEASURING APPARATUS

(75) Inventor: Hai-Jo Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/041,400

(22) Filed: Mar. 3, 2008

(65) Prior Publication Data

US 2009/0103108 A1    Apr. 23, 2009

(30) Foreign Application Priority Data

Oct. 18, 2007    (CN) .................... 2007 1 0202130

(51) Int. Cl.
*G01B 11/24* (2006.01)
(52) U.S. Cl. .................... 356/601; 356/612; 356/369
(58) Field of Classification Search ......... 356/601–623, 356/364–369; 250/559.22, 559.23
See application file for complete search history.

(56) References Cited

U.S. PATENT DOCUMENTS

| | | | |
|---|---|---|---|
| 5,024,529 A * | 6/1991 | Svetkoff et al. ............. | 356/608 |
| 6,791,696 B1 * | 9/2004 | Fantone et al. ............. | 356/601 |
| 7,318,285 B2 | 1/2008 | Matsumiya et al. | |
| 2008/0151271 A1 * | 6/2008 | Mikami ...................... | 356/630 |

* cited by examiner

*Primary Examiner*—Hoa Q Pham
(74) *Attorney, Agent, or Firm*—Andrew C. Cheng

(57) ABSTRACT

A surface profile measuring apparatus includes a light source assembly, a spatial light modulator, a spectroscope, a wave-front sensor, and a control-processing device. The light source assembly has a liquid crystal display pixel structure and is configured for providing parallel light. The spatial light modulator is positioned to receive the light from the light source assembly. The spectroscope is positioned to receive the light from the spatial light modulator. The wave-front sensor is positioned to receive the light from the spectroscope. The control-processing device is electrically connected to the spatial light modulator and the wave-front sensor. The surface profile measuring apparatus can measure the surface profile of an object and not contact the surface of the object in cooperation with the spatial light modulator, the spectroscope and the wave-front sensor. Therefore, the surface of the object is protected from being damaged.

7 Claims, 3 Drawing Sheets

SURFACE PROFILE MEASURING APPARATUS

RELATED FILED

The present invention relates to a surface profile measuring apparatus, and more particularly, to a non-contact surface profile measuring apparatus.

BACKGROUND

A surface profile measuring instrument that measures a profile of a surface of a workpiece with a contact probe attached to a coordinates measuring machine has been known. The instrument continuously measures the surface profile of a workpiece by scanning and profiling the surface of the workpiece with a tip end of a stylus. A conventional surface profile measuring instrument has a contact probe having a contact portion for contacting the surface of the workpiece, a drive mechanism for moving the contact probe in X, Y, and Z directions, and a controller that controls the movement of the contact portion of the contact probe through the drive mechanism.

In measuring, the above contact probe of the surface profile measuring instrument may deform or can be damaged under a pressure. So, the capability of the instrument is degraded and may, because of its deformity, damage a workspace such as marring the surface of a lens.

It is desired to provide a non-contact surface profile measuring apparatus which can overcome the above-described deficiencies.

SUMMARY

According to the present invention, a surface profile measuring apparatus for measuring a surface profile of an object includes a light source assembly, a spatial light modulator, a spectroscope, a wave-front sensor, and a control-processing device. The light source assembly is configured for providing parallel light. The spatial light modulator has a liquid crystal display pixel structure and is positioned to receive the light from the light source assembly. The liquid crystal display pixel includes a plurality of pixel cells. The spectroscope is positioned between the spatial light modulator and the object, and is configured for transmitting the light from the spatial light modulator and reflecting light from the object. The wave-front sensor is positioned to receive the light reflected from the spectroscope and configured for acquiring wave-front slope value of the light corresponding to each of pixel cells of the spatial light modulator. The control-processing device is electrically connected to the spatial light modulator and the wave-front sensor and configured for controlling turn-on/turn-off of each pixel of the spatial light modulator to transmit/reflect the light. The control-processing device is further configured for processing the wave-front slope value output from the wave-front sensor to acquire the surface profile of the object.

Other novel features and advantages will become more apparent from the following detailed description when taken in conjunction with the accompanying drawings.

BRIEF DESCRIPTION OF THE DRAWINGS

The present instruction and method is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a surface profile measuring apparatus according to an embodiment of the present invention will now be made with reference to the drawings attached hereto.

Figure 1:
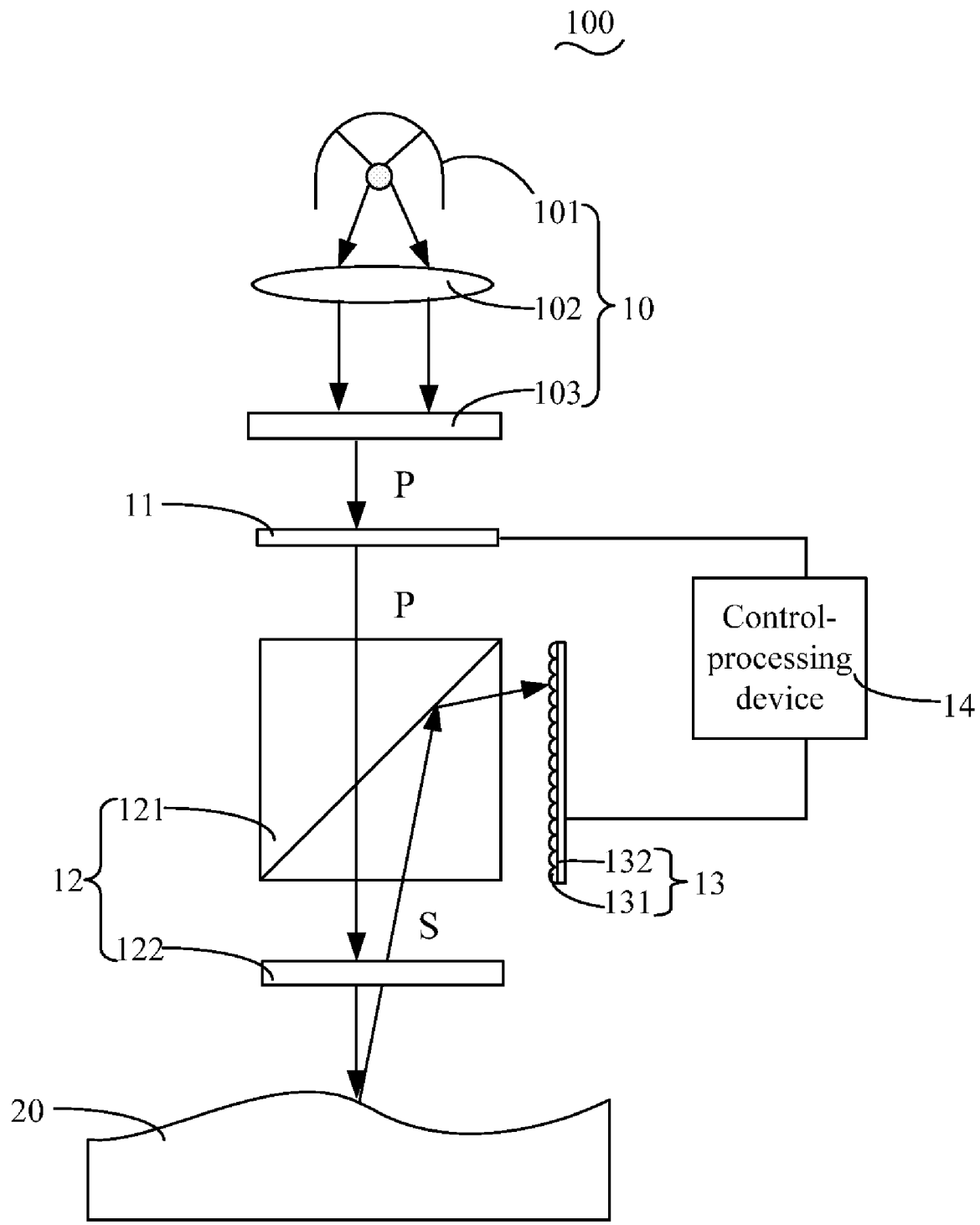
FIG. 1 is a schematic view of a configuration of a surface profile measuring apparatus in accordance with a present embodiment.

Referring to FIG. 1, a surface profile measuring apparatus 100 according to a present embodiment is shown. The surface profile measuring apparatus 100 includes a light source assembly 10, a spatial light modulator 11, a spectroscope 12, a wave-front sensor 13, and a control-processing device 14 electrically connected to the spatial light modulator 11 and the wave-front sensor 13.

In the embodiment, a lens 20 is present only as an example of a workpiece to illustrate the working principle of the system 100. It can be understood that the surface profile measuring apparatus 100 can be used with many other kinds of workpiece.

The light source assembly 10 includes a light source 101, a collimating lens 102, and a polarization converter 103. The light source 101 is configured for emitting diverging non-polarizing white light for the system 100 and can be a halogen lamp, a metal halogen lamp, an LED, and the like. In the present embodiment, the light source 101 is a halogen lamp that emits a white light. The collimating lens 102 is positioned to receive the light emitted from the light source 101 and configured for converting diffused light emitted from the light source 101 into parallel light. The polarization converter 103 is positioned to receive the parallel light from the collimating lens 102 and configured for converting the non-polarized parallel light output from the collimating lens 102 into polarized light having single polarization. The polarized light can be S-polarized light or P-polarized light. In the first embodiment, the polarized light is P-polarized light.

The control-processing device 14 can be a computer and is configured for controlling the spatial light modulator 11 to work and process data transferred from the wave-front sensor 13. The control-processing device 14 executes a program to perform or process instructions from users or data from the wave-front sensor 13. The control-processing device 14 controls the spatial light modulator 11 to turn-on or turn-off each pixel of the spatial light modulator 11 to transmit or reflect light entered into the spatial light modulator 11 in cooperation with the program. The control-processing device 14 synchronizes the wave-front sensor 13 and the spatial light modulator 11 and processes signals and data from the wave-front sensor 13. In particular, the control-processing device 14 has a slope-dimension program configured for processing wave-front slope of light entering into the wave-front sensor 13 to acquire dimension of a surface of the lens 20 and further acquire the surface profile of the lens 20.

The spatial light modulator 11 can be a liquid crystal device (LCD) and has a liquid crystal display pixel structure including a number of pixel cells. The program installed in the control-progressing device 14 controls each electrode of the spatial light modulator 11 to turn on or turn off. And the program further controls each of pixel cells corresponding to each of the electrodes to turn on or turn off to let light pass through or be reflected by the spatial light modulator 11. The spatial light modulator 11 scans the surface of the lens 20 under the control of the control-processing device 14.

The spectroscope 12 is positioned between the spatial light modulator 11 and the object 20, and includes a polarization beam splitter 121 and a quarter-wave retarder 121 positioned to receive the light from the polarization beam splitter 121.

The polarization beam splitter 121 can be a wire grid polarizer (WGP), or a polarizing beam splitter prism. The polarization beam splitter 121 can transmit S-polarized light and reflect P-polarized light or reflect S-polarized light and transmit P-polarized light. In the present embodiment, the polarization beam splitter 121 is a polarizing beam splitter prism. The quarter wave retarder 122 is configured for converting the polarization direction of the P-polarized light output from the polarization beam splitter 121. When the P-polarized light passes through the quarter wave retarder 122 twice, it is converted into S-polarized light. In the present embodiment, the P-polarized light firstly passes through the quarter wave retarder 122 after passing through the polarization beam splitter 121 and reaches the measured surface of the lens 20. Then, the P-polarized light is reflected by the measured surface of the lens 20 and reaches the quarter wave retarder 122 and is converted into S-polarized light when it exits from the quarter wave retarder 122. Finally, the S-polarized light is reflected by the polarization beam splitter 121.

The wave-front sensor 13 can be a Shack-Hartmann wave-front sensor and mainly includes a micro-lens array 131 and an light sensor 132 positioned to receive light output from the micro-lens array 131. The micro-lens array 131 has a number of micro lenses and is configured for condensing the light output from the polarization beam splitter 121 of the spectroscope 12 to promote the brightness of the light. The light sensor 132 can be a charge coupled device (CCD) or a complementary metal oxide semiconductor (CMOS). In the present embodiment, the light sensor 132 is a CCD. When light enters one micro lens of the micro-lens array 131, a portion of the sensor 132 is illuminated. When a surface of a detected object is a plane, wave-front slope of the light before entering the wave-front sensor 13 is not changed, and the portion illuminated by the light sensor 132 is taken as a reference position. A reference value of the wave-front sensor 13 according to the reference position is recorded in the control-processing device 14. When the surface of the detected object is not a plane, wave-front slope of a light before entering the wave-front sensor 13 is changed, and the light illuminates a different or overlapping portion of the light sensor 132. Therefore, the wave-front slope of the light can be acquired according to deviation of the position of the illuminated portion of the light sensor 132. Then, the slope-dimension program installed in the control-processing device 14 processes the wave-front slope of the light. Thus, the surface profile of the detected object may be achieved.

Figure 2:
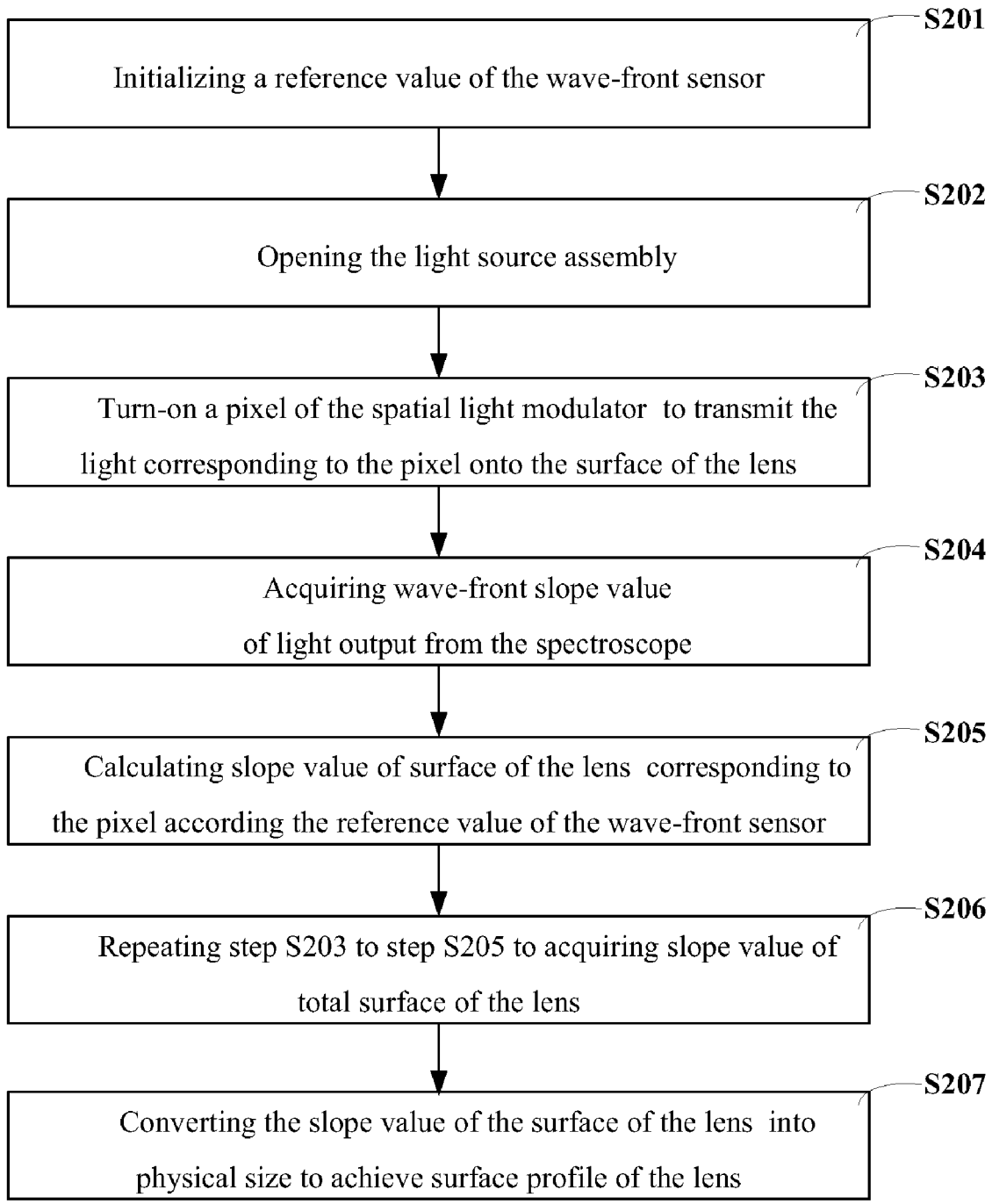
FIG. 2 is a flow chart of an exemplary surface profile measuring method, utilizing the instrument of FIG. 1.

Referring to FIG. 2, a flow chart of an exemplary surface profile measuring method of the lens 20 is shown. The method includes:

step S201: initializing a reference value of the wave-front sensor 13;

step S202: opening the light source assembly 10;

step S203: turn-on a pixel of the spatial light modulator 11 to transmit the light from the pixel onto the surface of the lens 20;

step S204: acquiring wave-front slope value of light output from the spectroscope 12;

step S205: calculating slope value of surface of the lens 20 corresponding to the pixel according the reference value of the wave-front sensor;

step S206: repeating step S203 to step S205 to acquiring slope value for all of the scanned surface of the lens 20; and step S207: converting the slope value of the surface of the lens 20 into dimension to achieve surface profile of the lens 20.

Figure 3:
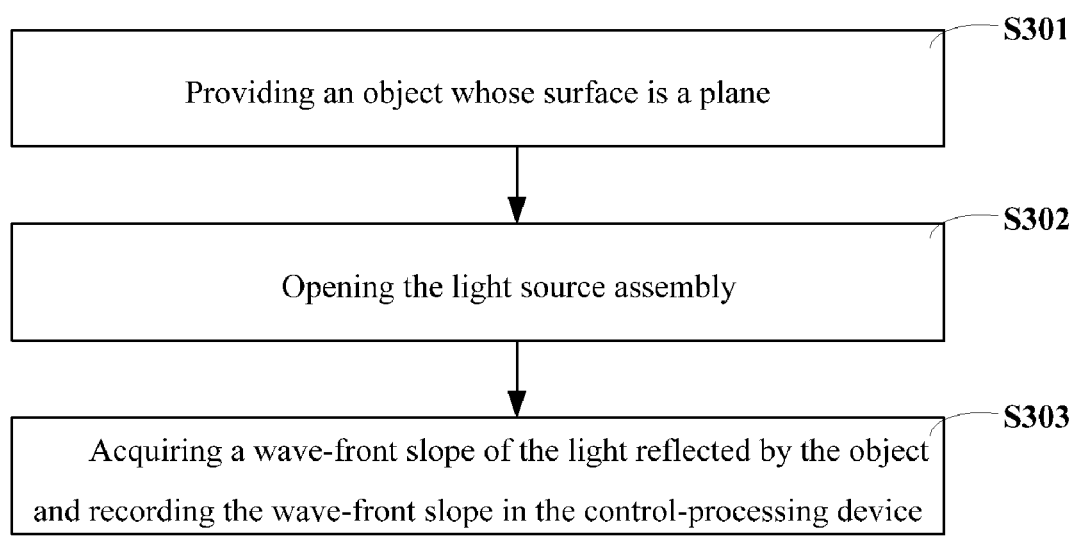
FIG. 3 is a flow chart of a method for initializing a reference value of a wave-front sensor of FIG. 1.

In step 201, the reference value of the wave-front sensor 13 changes as with change in direction of the light entering the wave-front sensor 13. Referring to FIG. 3, a flow chat of method of initializing the reference value of the wave-front sensor 13 is shown. The method includes:

step S301: providing an object whose surface is a plane;

step S302: opening the light source assembly 10;

step S303: acquiring a wave-front slope of the light reflected by the object and recording the wave-front slope in the control-processing device 14.

As described above, the reference value of the wave-front sensor 13 is obtained.

In the measuring method, after wave-front slope corresponding to one pixel of the spatial light modulator 11 is acquired, the control-processing device 14 control the spatial light modulator 11 to turn off the current pixel and turn on a next pixel. Thus, repeating step S203 to step S205, the control-processing device 14 controls the spatial light modulator 11 to scan the surface of the lens 20 so as to acquire the surface profile of the lens 20. A next process such as judging if the surface profile of the lens 20 accords with a standard can be performed.

The surface profile measuring apparatus and method can measure the surface profile of an object and not contact the surface of the object in cooperation with the spatial light modulator, the spectroscope and the wave-front sensor. Therefore, the surface of the object is protected from being damaged by a stylus or the like.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A surface profile measuring apparatus for measuring a surface profile of an object, comprising:

a light source assembly configured for providing parallel light;

a spatial light modulator having a liquid crystal display pixel structure and positioned to receive the light from the light source assembly, the liquid crystal display pixel structure comprising a plurality of pixel cells;

a spectroscope for being positioned between the spatial light modulator and the object, the spectroscope being configured for transmitting the light from the spatial light modulator and reflecting the light from the object;

a wave-front sensor positioned to receive the light reflected from the spectroscope and configured for acquiring a wave-front slope value of the light corresponding to each pixel of the spatial light modulator; and a control-processing device electrically connected to the spatial light modulator and the wave-front sensor and configured for controlling turn-on/turn-off of each of pixel cells of the spatial light modulator to transmit/reflect the light and processing the wave-front slope value output from the wave-front sensor to acquire the surface profile of the object.

2. The surface profile measuring apparatus as claimed in claim 1, wherein the light source assembly comprises a light source for emitting diverging non-polarizing white light, a collimating lens positioned to receive the light from the light source, and a polarization converter positioned to receive the light from the collimating lens, the collimating lens configured for converting the diverging light emitted from the light source into the parallel light, the polarization converter configured for converting the non-polarized white light output from the collimating lens into a polarized light having single polarization.

3. The surface profile measuring apparatus as claimed in claim 1, wherein the spectroscope comprises a polarizing beam splitter and a retarder disposed between the polarizing beam splitter and the object.

4. The surface profile measuring apparatus as claimed in claim 3, wherein the polarizing beam splitter is a wire grid polarizer.

5. The surface profile measuring apparatus as claimed in claim 3, wherein the polarizing beam splitter is a polarizing beam splitter prism.

6. The surface profile measuring apparatus as claimed in claim 1, wherein the wave-front sensor is a Shack-Hartman wave-front sensor.

7. The surface profile measuring apparatus as claimed in claim 1, wherein the wave-front sensor comprises a micro-lens array and an image sensor positioned to receive the light from the micro-lens array.

* * * * *